United States Patent
Böhm

(10) Patent No.: US 12,097,834 B2
(45) Date of Patent: Sep. 24, 2024

(54) METHOD FOR DETERMINING AN OPERATING VARIABLE OF A DRUM BRAKE, DRUM BRAKE ASSEMBLY

(71) Applicant: Continental Teves AG & Co. OHG, Frankfurt am Main (DE)

(72) Inventor: Jürgen Böhm, Oberneisen (DE)

(73) Assignee: Continental Teves AG & Co. OHG, Frankfurt am Main (DE)

( * ) Notice: Subject to any disclaimer, the term of this patent is extended or adjusted under 35 U.S.C. 154(b) by 283 days.

(21) Appl. No.: 17/617,140

(22) PCT Filed: May 27, 2020

(86) PCT No.: PCT/EP2020/064749
§ 371 (c)(1),
(2) Date: Dec. 7, 2021

(87) PCT Pub. No.: WO2020/245008
PCT Pub. Date: Dec. 10, 2020

(65) Prior Publication Data
US 2022/0250593 A1 Aug. 11, 2022

(30) Foreign Application Priority Data
Jun. 7, 2019 (DE) .................. 10 2019 208 356.0

(51) Int. Cl.
*B60T 8/172* (2006.01)
*B60T 8/171* (2006.01)
(Continued)

(52) U.S. Cl.
CPC .............. *B60T 8/172* (2013.01); *B60T 8/171* (2013.01); *B60T 8/885* (2013.01); *B60T 13/746* (2013.01); *B60T 2270/413* (2013.01)

(58) Field of Classification Search
CPC .......... B60T 8/172; B60T 8/171; B60T 8/885; B60T 13/746; B60T 1/067; B60T 13/74;
(Continued)

(56) References Cited

U.S. PATENT DOCUMENTS 6,536,562 B1    3/2003  Böhm et al.
6,607,253 B1 *  8/2003  Yamamoto ............. B60T 7/042
                                                   303/155

(Continued)

FOREIGN PATENT DOCUMENTS

CN      1573158 A       2/2005
CN      208503306       2/2019
(Continued)

OTHER PUBLICATIONS

Office Action dated Mar. 18, 2020 from corresponding German patent application No. DE 10 2019 208 356.0.
(Continued)

*Primary Examiner* — Ig T An

(57) ABSTRACT

A method for determining an operating variable of a drum brake comprises actuating the brake in at least one of: a first wheel speed range and a second wheel speed range. The operating variable is calculated based on bearing force of a leading brake shoe and the further bearing force of a trailing brake shoe when in the first wheel speed range. The operating variable is calculated when in the second wheel speed range based on a current actuator position and an actuator contact position, in which brake shoes of the drum brake come into engagement with a drum of the drum brake.

16 Claims, 3 Drawing Sheets

(51) Int. Cl.
*B60T 8/88* (2006.01)
*B60T 13/74* (2006.01)

(58) Field of Classification Search
CPC ...... B60T 13/741; B60T 17/18; B60T 17/221; F16D 51/20; F16D 65/08
See application file for complete search history.

(56) References Cited

U.S. PATENT DOCUMENTS

| | | |
|---|---|---|
| 2004/0251100 A1 | 12/2004 | Maehara |
| 2011/0100768 A1* | 5/2011 | Baumgartner ........ F16D 65/092 188/72.2 |
| 2020/0180575 A1 | 6/2020 | Vey et al. |

FOREIGN PATENT DOCUMENTS

| | | |
|---|---|---|
| DE | 3323114 A1 | 1/1985 |
| DE | 102005021719 A1 | 11/2006 |
| DE | 102008050215 A1 | 4/2010 |
| DE | 102017217413 A1 | 4/2019 |
| EP | 0988468 A1 | 3/2000 |
| EP | 0994797 A1 | 4/2000 |
| EP | 1095834 A2 | 5/2001 |
| EP | 0994797 B1 | 5/2002 |
| EP | 0988468 B1 | 8/2004 |
| JP | 2000033861 A * | 7/2001 ............ B60T 13/662 |
| JP | 2001191903 A * | 2/2002 ............ B60T 17/221 |
| JP | 2011156959 A | 8/2011 |
| WO | 2006119837 A1 | 11/2006 |
| WO | 2019063279 A1 | 4/2019 |

OTHER PUBLICATIONS

International Search Report and Written Opinion dated Oct. 23, 2020 from corresponding International Patent application No. PCT/EP2020/064749.
Notice of Reasons for Refusal drafted Dec. 21, 2022 for the counterpart Japanese Patent Application No. 2021-569939.
Request for the Submission of an Opinion dated Feb. 7, 2023 for the counterpart Korean Patent Application No. 10-2021-7037445.
Office Action dated Apr. 9, 2024 of the Counterpart WOCN application No. 202080040564.1.
Notice of Allowance dated Jun. 27, 2023 of the counterpart EP application No. 20730583.0.
Office Action dated Apr. 9, 2024 of the Counterpart WOCN application No. 202080040564.1. Previously submitted.
Zhang Jian et al., "Study on Method for Calculating Braking Torque of Leading and Trailing Shoe Brake", ournal of Changsha Communications University, vol. 17, No. 3, Sep. 2001 and machine translation of same. Cited in NPL Cite No. 1.
Office Action published Jul. 23, 2024 of the Counterpart Brazilian Patent Application No. BR112021024599-5 and informal translation of same.

* cited by examiner

METHOD FOR DETERMINING AN OPERATING VARIABLE OF A DRUM BRAKE, DRUM BRAKE ASSEMBLY

CROSS REFERENCE TO RELATED APPLICATIONS

This U.S. patent application claims the benefit of PCT patent application No. PCT/EP2020/064749, filed May 27, 2020, which claims the benefit of German patent application No. DE10 2019 208 356, filed Dec. 21, 2018, both of which are hereby incorporated by reference.

TECHNICAL FIELD

The invention relates to a method for determining an operating variable of a drum brake and to a drum brake assembly for carrying out a method of this kind.

BACKGROUND

Drum brakes can be actuated electromechanically, for example, and can be operated as service brakes with a parking brake function, for example. To determine the braking torque on the basis of measured forces, it is possible, for example, to measure reaction forces of the forces applied by a spreader unit, which are supported on a supporting bearing.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A method for determining an operating variable of a drum brake is provided. The drum brake can be actuated by means of an electromechanical actuator. An actuator of this kind can typically be moved along a defined path. The method can be employed at least in a first wheel speed range and a second wheel speed range, wherein wheel speeds of the first wheel speed range are higher than wheel speeds of the second wheel speed range. In this case, the wheel speed ranges typically do not overlap, or overlap only within a hysteresis, as will be described in greater detail below.

The method comprises in the first wheel speed range determining at least one bearing force of a leading brake shoe and a further bearing force of a trailing brake shoe of the drum brake, and calculating the operating variable based on the bearing force and the further bearing force In the second wheel speed range determining at least one current actuator position, and calculating the operating variable based on the actuator position and an actuator contact position, in which brake shoes of the drum brake come into engagement with a drum of the drum brake.

The method allows calculation of an operating variable both at high wheel speeds and at low wheel speeds. At high wheel speeds, the proposed procedure is used in accordance with the first wheel speed range, and it has been found advantageous in the case of high wheel speeds to measure the bearing forces mentioned and use them accordingly. At low wheel speeds, it has been found that this procedure is not advantageous. Accordingly, it is better to use the actuator position relative to the actuator contact position. This has proven advantageous for low wheel speeds.

The actuator contact position can be determined, for example, by measuring the force in the supporting bearing during an application movement of the actuator from the unactuated state. When a predefined force threshold is exceeded, the application of the brake shoes to the drum is detected, and the associated actuator position is defined as the actuator contact position.

The wheel speed ranges may also overlap, e.g. by means of a hysteresis, and therefore frequent switching between the wheel speed ranges is prevented, particularly in a transitional range. A threshold at which a switch is made from the first wheel speed range to the second wheel speed range may be lower than a threshold at which a switch is made from the second wheel speed range to the first wheel speed range.

The actuator position can be determined or defined along a movement path of the actuator, for example. Here, the actuator contact position is the position at which the brake shoes just come into engagement with the drum. This actuator contact position may change depending on factors such as wear or temperature.

The operating variable in the case of a rotating drum of the drum brake can be a braking torque, for example. This can be used to advantage for controlling the drum brake.

In the first wheel speed range, the operating variable can advantageously be calculated as the difference between the bearing force and the further bearing force. This typically gives an effective braking torque.

In the first wheel speed range, if the direction of rotation is unknown, the operating variable can be calculated as the difference between the higher of the bearing force and the further bearing force minus the lower of the bearing force and the further bearing force. This enables the method to be employed even in a case in which no information on the direction of rotation is available. In this case, it is then typically also not known initially which brake shoe is the leading or the trailing brake shoe.

In the second wheel speed range, it is possible, in particular, for the operating variable to be calculated as the product of a first multiplier and a function, wherein a difference between the actuator position and the actuator contact position is an input variable of the function. It has been found that operating variables can be calculated reliably in this way.

It is possible, for example for the first multiplier to be calculated as a quotient with a dividend and a divisor, wherein the dividend can be calculated as the average of a difference between the bearing force and the further bearing force over a predetermined period of time, and wherein the divisor can be calculated as the average of the function over a predetermined value range. It is thereby possible to perform adaptation of the operating variable calculation in such a way that there is no jump in the calculated operating variable at the transition between the first wheel speed range and the second wheel speed range.

For example, the function can rise more sharply than a linear function. This reproduces typical operating situations.

It is possible, for example, for a transition from the first wheel speed range to the second wheel speed range to take place when a predetermined wheel speed threshold is undershot. The wheel speed threshold thereby indicates, for example, a boundary between the first wheel speed range and the second wheel speed range. The transition can thus occur, for example, when braking a vehicle to a standstill from driving.

When braking to a standstill by means of the drum brake in the applied state, calculation of the operating variable at a standstill can be performed in a manner identical to calculation in the second wheel speed range. This makes it possible to continue using the calculation already explained. Correspondingly obtained values have proven appropriate.

When actuating the drum brake out of the released state at a standstill, the operating variable at a standstill can be calculated as the product of a second multiplier and the higher of the bearing force and the further bearing force. This has proven to be an advantageous calculation method in the case in which the vehicle is not being braked to a standstill by means of the drum brake but comes to a standstill in some other way and only then is the drum brake activated. In this case, in contrast to the case of braking by means of the drum brake, there is no self locking of the drum brake, this fact being allowed for by means of the modified calculation method.

Insofar as predetermined values can be used in the calculations described here, these can be, for example, values at the design point of the drum brake under consideration.

At a standstill, it is possible, for example, for the operating parameter to be a clamping force. This can be used for controlling the drum brake, it being possible, for example, to prevent a vehicle from rolling on a slope.

It is possible, for example, for a transition from the second wheel speed range or from a standstill to the first wheel speed range to take place when a predetermined wheel speed threshold plus a hysteresis is exceeded. For example, this may be a matter of the wheel speed threshold already mentioned above, which marks the transition between the first wheel speed range and the second wheel speed range. The provision of a hysteresis makes it possible to prevent frequent switching in a transitional range.

For example, the bearing force can be measured at a supporting bearing for the brake shoe. The further bearing force can likewise be measured at a further supporting bearing for the further brake shoe. At that point, the relevant forces occur directly.

A drum brake assembly is further provided. The drum brake assembly has at least one brake shoe and one further brake shoe. It has at least one supporting bearing for the brake shoe and one further supporting bearing for the further brake shoe. The drum brake assembly has at least one force sensor at the supporting bearing for the purpose of measuring a bearing force produced in the supporting bearing by the brake shoe and at least one further force sensor at the further supporting bearing for the purpose of measuring a further bearing force produced in the further supporting bearing by the further brake shoe. The drum brake assembly furthermore has an evaluation device, which is configured to execute a method of determining an operating variable as described herein.

TA nonvolatile, computer-readable storage medium may be provided, on which program code is stored, during the execution of which a processor carries out a method as described herein.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
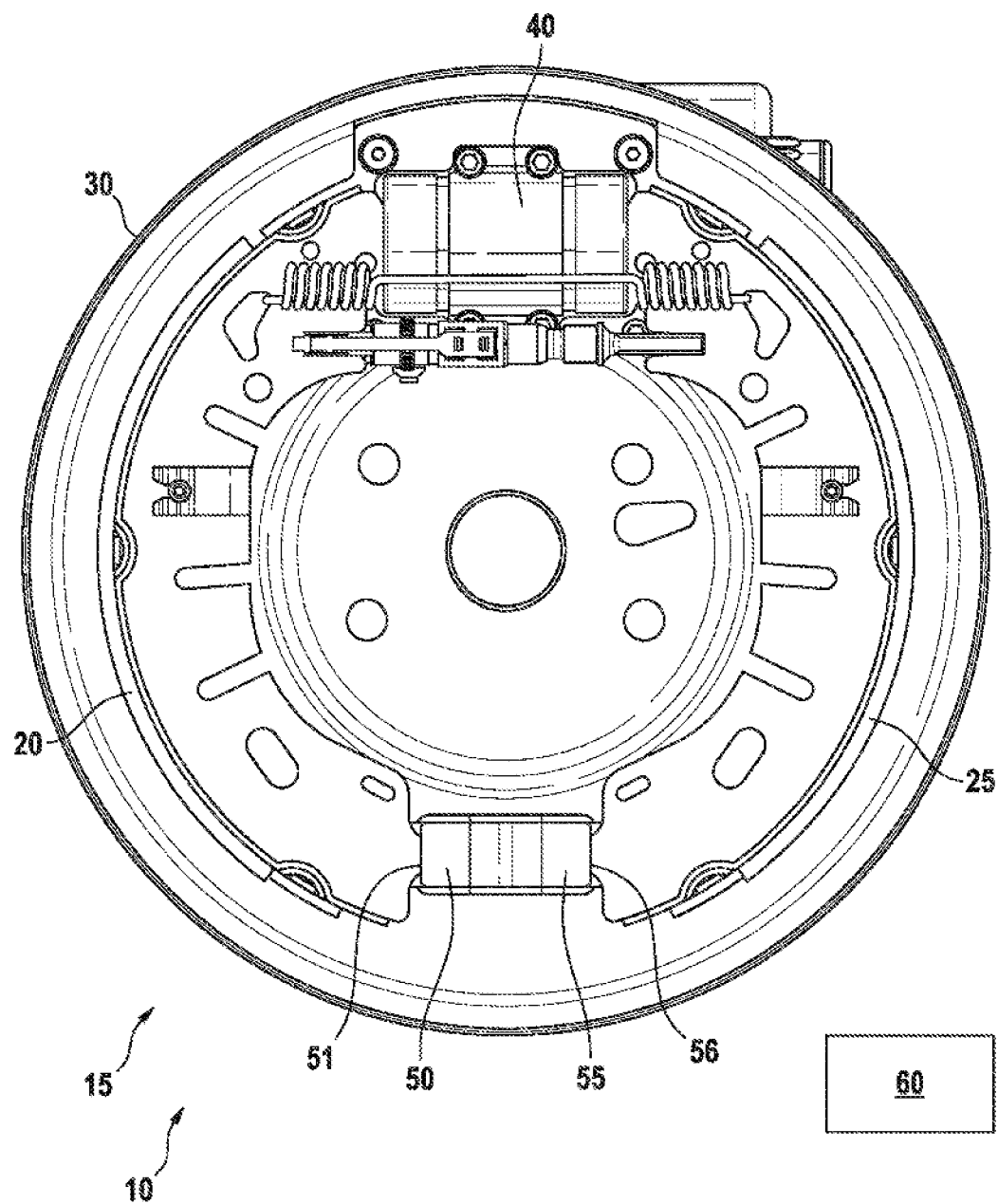
FIG. 1 shows a detail of a drum brake assembly.

FIG. 1 schematically shows a part of a drum brake assembly 10 having a drum brake 15. The drum brake assembly 10 has a brake shoe 20 and a further brake shoe 25. It has a brake drum 30, wherein the two brake shoes 20, 25 can be pressed against the brake drum 30 to actuate the drum brake assembly 10. An actuator 40 is used for this purpose. This is actuated electrically.

The drum brake assembly 10 has a supporting bearing 50 and a further supporting bearing 55. Here, the brake shoe 20 is supported on the supporting bearing 50. The further brake shoe 25 is supported on the further supporting bearing 55. Arranged in the supporting bearing 50 is a force sensor 51 for measuring a bearing force with which the brake shoe 20 is supported in the supporting bearing 50. Arranged in the further supporting bearing 55 is a further force sensor 56 for measuring a further bearing force with which the further brake shoe 25 is supported in the further supporting bearing 55.

The drum brake assembly 10 furthermore has an evaluation device 60, which is here illustrated only schematically. This is designed to execute a method according to the invention. One possible embodiment will be described below.

The forces measured in the supporting bearings 50, 55, which are supporting forces, are designated as $F_{Ab,Aufl}$ for the leading shoe and $F_{Ab,Abl}$ for the trailing shoe. These can assume widely differing values for the same actuator position. This can make it necessary to implement rescaling of the output values for force feedback, and therefore an operating state of the drum brake assembly 10 is taken into account only in an actual value calculation and not in a setpoint value calculation and a parameter adjustment of a force controller that is used. Here, a braking torque $M_{Br}$ can be calculated as follows, for example:

$$M_{Br} = m_l * (F_{Ab,Aufl} - F_{Ab,Abl}) = m_l * \Delta F$$

In this context, $m_l$ designates a predeterminable parameter and $\Delta F$ designates a force difference.

The force difference $\Delta F$ can be used, for example, as a controlled variable for the closed-loop or open-loop control of the drum brake 15.

In the case of a relatively high wheel speed $\omega_{Rad}$ which is in a first wheel speed range including all the wheel speeds $\omega_{Rad}$ above a threshold $\varepsilon$, a controlled variable $F_{Ctrl}$ can be calculated as follows as an operating parameter by means of the force difference and the forces measured in the supporting bearings 50, 55:

$$F_{Ctrl} = \Delta F = F_{Ab,Aufl} - F_{Ab,Abl}$$

If there is no information on the direction of rotation for the wheel speed $\omega_{Rad}$, the allocation of the two forces $F_{Ab,S1}$ and $F_{Ab,S2}$ measured in the supporting bearings 50, 55, which are generalized forms of the forces for the case where the leading and the trailing brake shoe have not yet been identified, can be performed by means of a maximum value and minimum value determination. The following then applies:

$$F_{Ctrl} = \Delta F = \text{Max}\{F_{Ab,S1}, F_{Ab,S2}\} - \text{Min}\{F_{Ab,S1}, F_{Ab,S2}\}$$

In the transitional range to particularly low wheel speeds $\omega_{Rad}$ which are below the abovementioned threshold value ε, the curve of the forces is not clearly defined since dynamic compensating processes are taking place here. Depending on how powerful the braking is, there may be a brief reversal of the torques. On completion of this compensating process, $F_{Ab,Auf} \approx F_{Ab,Abl}$ is approximately the case. As regards the calculation of the operating parameter, a force signal calculated from a characteristic curve is therefore determined as follows in this transitional range:

$$F_{Ctrl} = K_1 * f(X_{Sp} - X_0)$$

Here, $K_1$ designates a first multiplier, f designates a function, $X_{Sp}$ designates a current actuator position, and $X_0$ designates an actuator contact position, in which the brake shoes 20, 25 just rest by means of their respective linings against the brake drum 30.

To enable a changeover between the wheel speed ranges to take place without jumps, given a constant specified force, the force/displacement characteristic curve or function f used is preferably updated before the changeover by determining the first multiplier $K_1$ as a scaling parameter. A basis for this relationship is, for example, a characteristic curve which has been measured at a standstill in the torque-free state. In the present case, the following applies for the scaling factor or first multiplier $K_1$, which is preferably to be determined at low wheel speeds:

$$K_1 = \text{Average}\{\Delta F\} / \text{Average}\{f(X_{Sp} - X_0)\}$$

This allows virtually or completely jump-free calculation of the operating parameter. In this case, the force difference obtained in this process is typically calculated over a predetermined period of time, e.g. before the respective calculation. The function f is typically calculated over a predetermined value range of $X_{Sp}$.

For the case of standstill, i.e. $\omega_{Rad} = 0$, a distinction is drawn as to whether actuation of the drum brake assembly 10 takes place after braking by the drum brake assembly 10 or whether the vehicle has come to a standstill independently thereof.

In the first case, in which the vehicle has been braked by means of the drum brake assembly 10, the calculation continues to be formed under force control to avoid dealing with special cases, and therefore the signal calculated from a characteristic curve or function continues to be determined as the operating parameter or controlled variable:

$$F_{Ctrl} = K_1 * f(X_{Sp} - X_0)$$

If, when at a standstill, the actuation of the drum brake assembly 10 takes place from a previously released state, then, as the feedback signal, the higher of the two force values is determined because $F_{Ab,Auf} \approx F_{Ab,Abl}$:

$$F_{Ctrl} = K_2 * \text{Max}\{F_{Ab,S1}, F_{Ab,S2}\}$$

In this case, a second multiplier $K_2$ is defined in such a way that, for the case of a standstill and torque-free actuation, an achievable maximum supporting force at the design point corresponds approximately to the maximum differential force at the design point.

Figure 2:
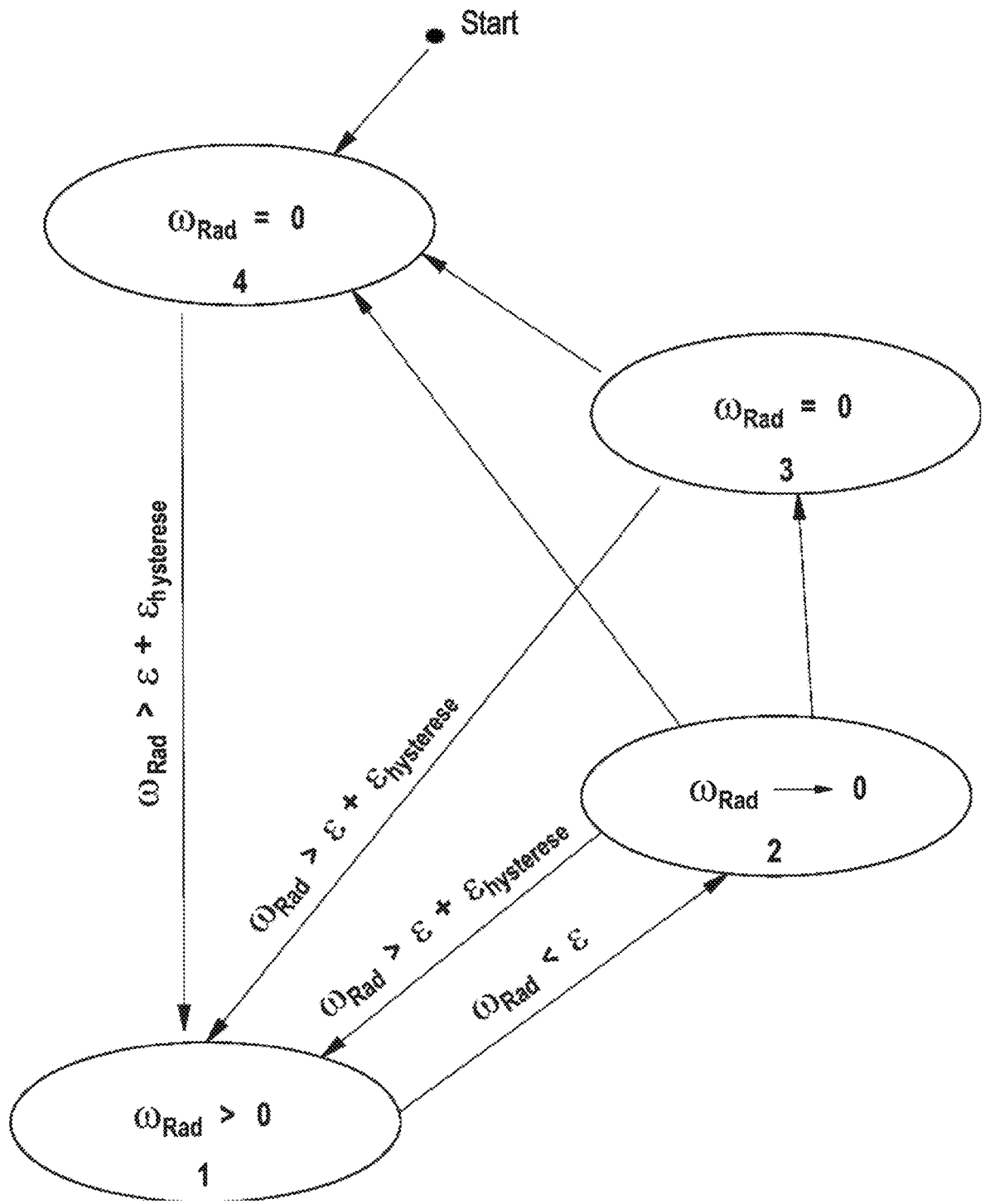
FIG. 2 shows a state diagram.

FIG. 2 shows a state diagram in which the four states already mentioned are illustrated.

State 1 is the case in which the wheel speed $\omega_{Rad}$ is in a typical normal operating range during driving, and the wheel speed $\omega_{Rad}$ is therefore in the first wheel speed range. In this case, calculation of the operating parameter can be performed based on a difference between the leading force and the trailing force.

If the wheel speed $\omega_{Rad}$ undershoots the threshold value ε, state 2 occurs. A return to state 1 is envisaged only if the wheel speed exceeds the threshold value ε plus a hysteresis $\varepsilon_{Hysterese}$. Continuous switching backward and forward between states and calculation methods stored in the states is thereby avoided in a transitional range.

In state 2, which corresponds to the second wheel speed range, calculation is performed as described above based on the function f and the actuator position $X_{Sp}$ as well as the actuator contact position $X_0$.

If the braking forces $F_{Ab,Auf}$ and $F_{Ab,Abl}$ are approximately equal or if, in the present implementation, a predetermined transition time has expired, the procedure switches to state 3. In this case, it is assumed that the wheel speed $\omega_{Rad}$ is equal to zero, that is to say the vehicle is stationary. In this case, in which the vehicle has been braked by means of the drum brake assembly 10, the calculation is not modified, however.

In a development, the provision of state 3 opens up the possibility in this state of once again using the forces to determine the operating variable. Here too, a further adaptable scaling factor, which ensures switching over without signal jumps, can preferably be provided for this purpose. Otherwise, as described here, the calculation can be carried out in accordance with state 2.

State 4 corresponds to a case in which the vehicle comes to a standstill independently of the drum brake assembly 10, that is to say, for example, merely coasts to a halt, and the drum brake assembly 10 is only then actuated. In this case, different force conditions apply since the self locking of the drum brake 15 is not active. In this case, calculation of the operating parameter takes place based on the higher of the two measured forces, as already described above.

Moreover, state 4 can also be reached directly from state 2 if the vehicle comes to a standstill in a corresponding manner.

As shown, state 1 is fundamentally adopted when the wheel speed $\omega_{Rad}$ exceeds the threshold value ε plus a predeterminable hysteresis $\varepsilon_{Hysterese}$.

By means of the sequence shown or states shown, it is possible to ensure that an operating parameter of the drum brake assembly 10 is always calculated with the best possible available calculation method.

Figure 3:
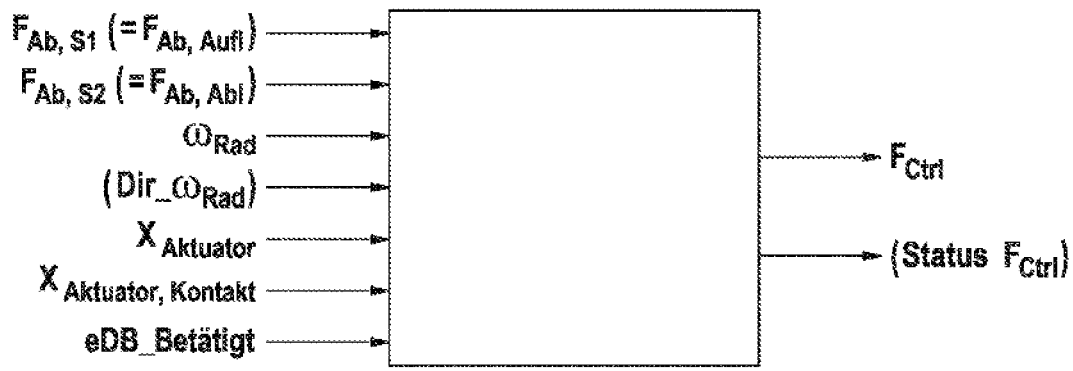
FIG. 3 shows processing of input variables to give output variables.

FIG. 3 shows schematically one possible calculation of output variables from input variables. Here, the already explained forces $F_{Ab}$,Aufl and $F_{Ab,Abl}$, which, in the case of an unknown direction of rotation, may also be designated as $F_{Ab,S1}$ and $F_{Ab,S2}$, serve as input variables. Also serving as input variables are the wheel speed $\omega_{Rad}$, the direction (Dir_$\omega_{Rad}$), the actuator position $X_{Aktuator}$ or $X_{Sp}$, the actuator contact position $X_{Aktuator, Kontakt}$ or $X_0$ and the information eDB_Betätigt, which indicates whether the drum brake assembly 10 is currently being actuated. In particular, the calculation produces the already mentioned operating parameter $F_{Ctrl}$ and an associated status.

Figure 4:
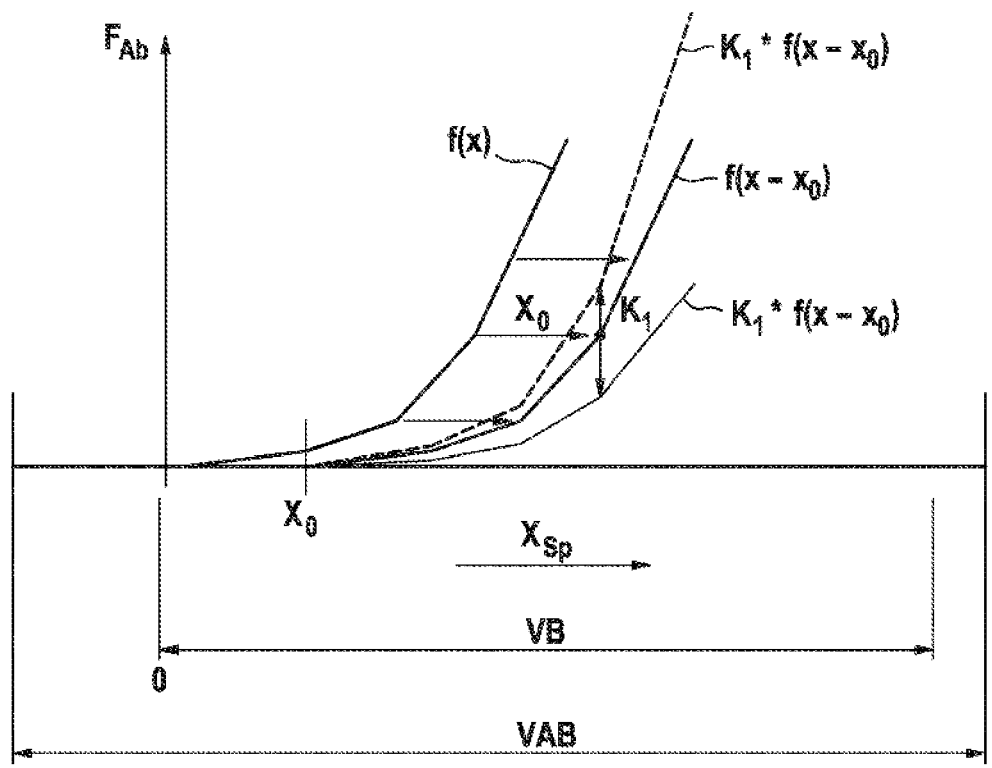
FIG. 4 shows function curves.

FIG. 4 shows a typical curve of the function f, which has already been described above. Here, the available movement range or working range of the actuator 40 is shown on the horizontal axis. Here, the entire working range available is denoted by the double arrow VAB. The actually usable movement range from the origin illustrated is denoted as VB.

On the one hand, the diagram shows the function f(X) in its original form, which becomes the function $f(X-X_0)$ when shifted to the right by the amount of the actuator contact position $X_0$. Starting from this function curve, the function can be scaled up or down, namely by means of the first multiplier $K_1$, two function curves with different values of $K_1$ being shown in FIG. 4. It is thereby possible to adapt the function f accordingly. As shown, the function f rises more sharply than a linear function, this having proven feasible and appropriate for typical applications.

The mentioned steps of the method may be carried out in the order indicated. However, they may also be carried out in a different order, if this is technically appropriate. In one of its embodiments, for example with a specific combination of steps, the method according to the invention may be carried out in such a way that no further steps are carried out. However, in principle, further steps can also be carried out, even steps that have not been mentioned.

It is pointed out that features may be described in combination in the claims and in the description, for example to facilitate understanding, although these may also be used separately from each other. A person skilled in the art will gather that such features may also be combined with other features or feature combinations independently of each other.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the scope of the following claims.

The invention claimed is:

1. A method for determining an operating variable of a drum brake comprising:
   actuating the brake with an electromechanical actuator in at least one of: a first wheel speed range and a second wheel speed range, wherein wheel speeds of the first wheel speed range are higher than wheel speeds of the second wheel speed range;
   determining at least one bearing force of a leading brake shoe and a further bearing force of a trailing brake shoe of the drum brake when in the first wheel speed range;
   calculating the operating variable when in the first wheel speed range based on the bearing force and the further bearing force;
   determining at least one current actuator position when in the second wheel speed range; and
   calculating the operating variable when in the second wheel speed range based on the actuator position and an actuator contact position, in which brake shoes of the drum brake come into engagement with a drum of the drum brake, wherein calculating the operating variable further comprises calculating a product of a first multiplier and a function in the second wheel speed range, and wherein a difference between the actuator position and the actuator contact position is an input variable of the function;
   calculating the first multiplier as a quotient with a dividend and a divisor;
   calculating the dividend as the average of a difference between a bearing force and a further bearing force over a predetermined period of time; and
   calculating the divisor as the average of the function over a predetermined value range.

2. The method as claimed in claim 1, wherein the operating variable in the case of a rotating drum of the drum brake is a braking torque.

3. The method as claimed in claim 1, wherein calculating the operating variable further comprises calculating the difference between the bearing force and the further bearing force in the first wheel speed range.

4. The method as claimed in claim 3, wherein when the direction of rotation is unknown, wherein calculating the operating variable further comprises calculating the difference between the higher of the bearing force and the further bearing force minus the lower of the bearing force and the further bearing force.

5. The method as claimed in claim 1, wherein a transition from the first wheel speed range to the second wheel speed range takes place below a predetermined wheel speed threshold.

6. The method as claimed in claim 1, wherein calculating the operating variable at a standstill is the same as calculating in the second wheel speed range when braking to a standstill with the drum brake in the applied state.

7. The method as claimed in claim 6, wherein the operating parameter at a standstill is a clamping force.

8. The method as claimed in claim 1, wherein calculating the operating variable further comprises calculating a product of a second multiplier and the higher of the bearing force and the further bearing force when actuating the drum brake out of the released state at a standstill.

9. The method as claimed in claim 8, wherein calculating the second multiplier further comprises calculating quotient of a maximum achievable torque-free clamping force divided by a maximum bearing force difference.

10. The method as claimed in claim 1, wherein a transition from one of the second wheel speed range and a standstill to the first wheel speed range takes place when a predetermined wheel speed threshold plus a hysteresis is exceeded.

11. The method as claimed in claim 1, further comprising measuring at least one of the bearing force at a supporting bearing for the brake shoe,
   and the further bearing force at a further supporting bearing for a further brake shoe.

12. A drum brake assembly, comprising:
   at least one brake shoe and one further brake shoe;
   at least one supporting bearing for the brake shoe and one further supporting bearing for the further brake shoe;
   at least one force sensor at the supporting bearing which measures a bearing force produced in the supporting bearing by the brake shoe;
   at least one further force sensor at the further supporting bearing which measures a further bearing force produced in the further supporting bearing by the further brake shoe, and
   an evaluation device which executes a method for determining an operating variable of a drum brake comprising:
      actuating the brake with an electromechanical actuator in at least one of: a first wheel speed range and a second wheel speed range, wherein wheel speeds of the first wheel speed range are higher than wheel speeds of the second wheel speed range;
      determining at least one bearing force of a leading brake shoe and a further bearing force of a trailing brake shoe of the drum brake when in the first wheel speed range;
      calculating the operating variable when in the first wheel speed range based on the bearing force and the further bearing force;

determining at least one current actuator position when in the second wheel speed range; and calculating the operating variable when in the second wheel speed range based on the actuator position and an actuator contact position, in which brake shoes of the drum brake come into engagement with a drum of the drum brake, wherein the operating variable is a product of a first multiplier and a function in the second wheel speed range, and wherein a difference between the actuator position and the actuator contact position is an input variable of the function, and wherein the first multiplier as a quotient with a dividend and a divisor, the dividend is an average of a difference between a bearing force and a further bearing force over a pre-determined period of time, and the divisor is an average of the function over a predetermined value range.

13. The brake assembly as claimed in claim 12, wherein the operating variable in the case of a rotating drum is a braking torque.

14. The brake assembly as claimed in claim 12, wherein the operating variable is the difference between the bearing force and the further bearing force in the first wheel speed range.

15. The brake assembly as claimed in claim 12, wherein the operating parameter at a standstill is a clamping force.

16. A method for determining an operating variable of a drum brake comprising:

actuating the brake with an electromechanical actuator in at least one of: a first wheel speed range and a second wheel speed range, wherein wheel speeds of the first wheel speed range are higher than wheel speeds of the second wheel speed range;

determining at least one bearing force of a leading brake shoe and a further bearing force of a trailing brake shoe of the drum brake when in the first wheel speed range;

calculating the operating variable when in the first wheel speed range based on the bearing force and the further bearing force;

determining at least one current actuator position when in the second wheel speed range; and calculating the operating variable when in the second wheel speed range based on the actuator position and an actuator contact position, in which brake shoes of the drum brake come into engagement with a drum of the drum brake, wherein calculating the operating variable further comprises calculating a product of a first multiplier and a function in the second wheel speed range, and wherein a difference between the actuator position and the actuator contact position is an input variable of the function, wherein the function rises exponentially.

* * * * *